(12) United States Patent
Nakano et al.

(10) Patent No.: US 7,104,708 B2
(45) Date of Patent: Sep. 12, 2006

(54) SECTOR DRIVE UNIT FOR CAMERA

(75) Inventors: Yoichi Nakano, Chiba-ken (JP); Hiroshi Takahashi, Chiba-ken (JP)

(73) Assignee: SEIKO Precision Inc., (JP)

( * ) Notice: Subject to any disclaimer, the term of this patent is extended or adjusted under 35 U.S.C. 154(b) by 116 days.

(21) Appl. No.: 10/825,550

(22) Filed: Apr. 14, 2004

(65) Prior Publication Data

US 2004/0223756 A1 Nov. 11, 2004

(30) Foreign Application Priority Data

Apr. 14, 2003 (JP) ............................. 2003-109418

(51) Int. Cl.
*G03B 9/40* (2006.01)
*G03B 9/08* (2006.01)

(52) U.S. Cl. ....................... 396/489; 396/463; 396/469

(58) Field of Classification Search ........ 396/483–489, 396/452, 465, 466, 469, 491, 492, 503, 505, 396/508, 463

See application file for complete search history.

(56) References Cited

U.S. PATENT DOCUMENTS 3,362,311 A * 1/1968 Singer ........................ 396/463
3,504,611 A * 4/1970 Richter et al. ............... 396/254
3,701,310 A * 10/1972 Dietz ........................... 396/251
4,671,637 A * 6/1987 Toyoda ........................ 396/466
6,485,200 B1 * 11/2002 Tanikawa et al. ........... 396/489

* cited by examiner

*Primary Examiner*—W. B. Perkey
*Assistant Examiner*—Rishi Suthar
(74) *Attorney, Agent, or Firm*—Adams & Wilks

(57) ABSTRACT

A sector drive unit for a camera includes sectors capable of opening and closing an aperture provided on a base plate. A first actuator drives the sectors to open and close the aperture, and a drive force transmitting mechanism transmits a driving force of the first actuator to the sectors. A sector retaining unit retains the sectors at the aperture-opening position or at the aperture-closing position, and a second actuator drives the sector retaining unit to a position to retain the sectors and to a position not to retain the sectors. The sector retaining unit prevents the sectors from moving accidentally due to an impact or the like when the sectors are at either the opened position or the closed position. The use of the second actuator for driving the sector retaining unit reduces power consumption and prevents generation of noise during the time of an exposure.

13 Claims, 10 Drawing Sheets

SECTOR DRIVE UNIT FOR CAMERA

BACKGROUND OF THE INVENTION

1. Field of the Invention

The present invention relates to a sector drive unit for a camera for driving, for example, a diaphragm device of a camera or a light-shielding device for a digital camera.

2. Description of the Related Art

In a diaphragm device for a normal silver-film-type camera (hereinafter referred to as "film-type camera") or in a light-shielding device for protecting an image pickup device such as a CCD or a C-MOS of a digital camera, a mechanism for opening and closing an aperture by pivotal movement of sectors is employed. In both of such a diaphragm device or a light-shielding device, the size of a diaphragm opening can be adjusted by pivoting the sectors by a drive motor, or the aperture can be opened or closed. The sectors are driven by operating the drive motor so that it outputs a sufficient amount of rotation for opening and closing the aperture by the sectors. Therefore, the drive motor is driven by an electric current having a number of drive pulses corresponding to the amount of movement of the sectors. For example, in the case of the light-shielding device for digital cameras, the sectors are closed for protecting the image pickup device when not taking a picture, and a light-shielding curtain is retracted from the aperture to open the aperture when taking a picture, and then the light-shielding curtain is moved over the aperture again to close the aperture after having taken the picture. However, during such operations, the drive motor is always supplied with electricity.

As described above, it is necessary to provide a complex and expensive pulse drive circuit for applying the desired number of drive pulses of electric current for opening and closing the sectors. In addition, driving by a plurality of drive pulses generates a time-lag, which causes failure of releasing the shutter at the right moment. In the case of the light-shielding device for digital cameras, electricity is continuously supplied for retaining the sectors in a fully opened state even during image reading by the image pickup device. This results in an increase in the amount of power consumption, and generation of noise. The above-described sectors are retained magnetically at a closed position when not taking a picture. However, when the camera is subjected to an impact, for example, due to dropping or the like, there may be a case where this retained state is released and the sectors are accidently moved to the opened state.

SUMMARY OF THE INVENTION

In order to solve the above-described problem, a sector drive unit for a camera according to the present invention includes a first actuator for driving sectors to open and close an aperture formed on a base plate, a drive force transmitting mechanism for transmitting the driving force of the first actuator to the sectors, a sector retaining unit for retaining the sectors at a position for opening the aperture and a position for closing the aperture, and a second actuator for driving the sector retaining unit to a position not to retain the sectors. The sector drive unit includes the sector retaining unit for retaining the sectors at the opened position and the closed position and is configured to be driven by the second actuator, which is different form the actuator for driving the sectors. The sector retaining unit is provided for preventing the sectors from opening accidentally by an impact or the like when the sectors are at the opened position or at the closed position, and the operation of the sector retaining unit is ensured by being driven by the second actuator.

The sector drive unit of the present invention is also employed for driving the sectors of a diaphragm device forming a diaphragm opening smaller than the aperture formed on the base plate. In this case, the sectors are driven by the first actuator. In the same manner, the sector retaining unit can be driven by the second actuator and is characterized in that the sectors are reliably retained at a selected aperture value. The diaphragm device can prevent the sectors from moving accidentally by the operation of the sector retaining unit when the selected aperture value is to be continuously retained.

The drive force transmitting mechanism in the respective sector drive units for a camera includes a drive member provided on a rotary shaft of the first actuator, and an operating member for operating the sectors in response to a driving force exerted by the drive member. The sector retaining unit is formed of a locking member provided so as to be moved in or retracted from the operating area of the operating member, and the sector retaining unit is configured to restrict the operation of the operating member when the locking member is moved in the operating area of the operating member, and release the restricted state of the operating member when the locking member is retracted from the operating area. The locking member is, as described above, driven by the second actuator which is different from the actuator for driving the sectors. Since the movement of the operating member into and out of the operating area is performed simply within a range corresponding to the angular range in which the rotor of the actuator rotates by one drive pulse, the drive circuit of the actuator may be simple, thereby reducing the product cost. Since the second actuator is not supplied with electricity when the locking member is moved in the operating area of the operating member and is restraining the operating member, reduction of power consumption is achieved. In addition, when the sector retaining unit is employed as the light-shielding device of a digital camera, since the electricity is not supplied to the sector retaining unit when the aperture is fully opened, generation of noise when the image pickup device is reading the image is prevented.

The second actuator is configured in such a manner that the supply of power is turned OFF when the sector retaining unit is at the sector retaining position, and the supply of power is turned ON when it is at a position not retaining the sectors. Accordingly, electricity must be supplied only when the sectors are in operation, and no electric power is necessary when the sectors are in a static state. Therefore, it contributes to reduce the power consumption, and in the case of a digital camera, generation of noise when the image pickup device is reading the image with the aperture open can be prevented.

BRIEF DESCRIPTION OF THE DRAWINGS

FIG. 6 is an enlarged view showing a state in which the locking member of the sector retaining unit is moved in;

DESCRIPTION OF THE PREFERRED EMBODIMENTS

Figure 1:
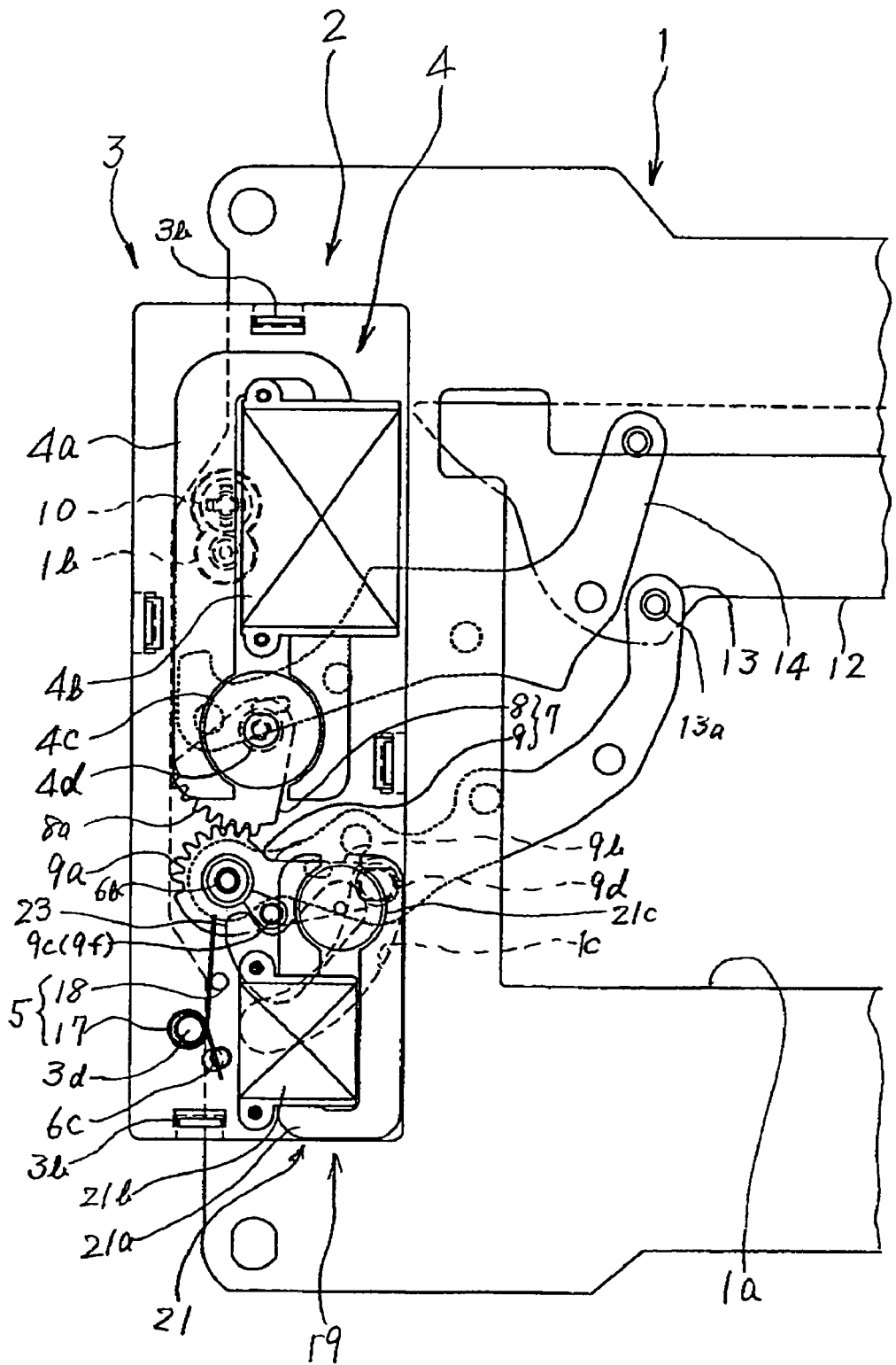
FIG. 1 is a plan view showing a state in which an aperture is fully closed and a sector retaining unit retains the sectors in a closed state.

Referring now to the drawings, an embodiment of the present invention will be described taking a light-shielding device of a digital camera as an example.

FIG. 1 to FIG. 4 are enlarged views showing a principal portion of the light shielding device described above. As shown in the drawings, the light-shielding device is structurally similar to a focal plane shutter in that an aperture can be opened and closed by a group of vanes or sectors which superimpose and deploy with each other. However, it does not have a front curtain and a rear curtain as in the case of the focal plane shutter, but has simply one light-shielding curtain which corresponds to either the front or the rear curtain. According to the present invention, a drive mechanism for opening and closing the sectors can easily be attached to or detached from a base plate 1 as a sector drive unit 2.

As shown in FIG. 1 to FIG. 4, the base plate 1 (only the left half being shown in the drawing) is formed of a plate member formed substantially into a rectangular shape, and an aperture 1a is provided at a position near the center thereof. The sector drive unit 2 for driving the sectors is mounted on the front surface (front side of the drawing) of the base plate 1 on the left side of the aperture 1a. The sector drive unit 2 is positioned by positioning pins 1b (only one of which is shown) projected from the front surface of the base plate 1, and fixed by screws 10, 10 as fixing members (see FIG. 7). A light-shielding curtain is provided on the base plate 1 at the position on the backside of the sector drive unit 2, so that the opening and closing operation of the aperture 1a can be carried out by the sector drive unit 2. The light-shielding curtain includes a plurality of sectors 12, only one of which is shown in the figure as being representative.

Figure 7:
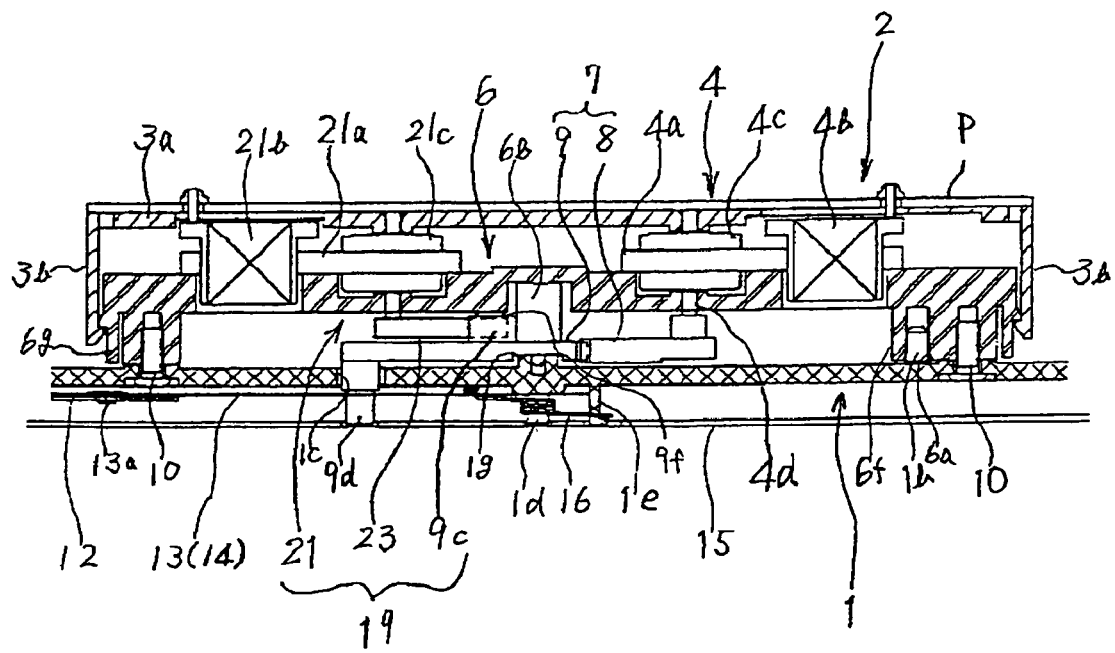
FIG. 7 is an enlarged cross-sectional view of a drive unit.

The sector drive unit 2 includes various elements assembled in a unit case 3, which can easily be attached to and detached from the base plate 1. The sector drive unit 2 includes mainly a first actuator 4, a synchronous switch 5 as a sector position detecting unit which will be described later, a drive force transmitting mechanism 7, and a sector retaining unit 19. The unit case 3 is represented only in outline form in FIGS. 1–4, which omit a printed board P and a top plate 3a of a support plate 3 (See FIG. 7) for the sake of more clearly showing the internal structure. The sector drive unit 2 is positioned on one surface (front surface) of the base plate 1 via a positioning pin 1b and is fixed to the base plate 1 via the screws 10, as shown in FIG. 7. Sectors 12 (only one of which is shown) comprise a light-shielding curtain capable of opening and closing the aperture 1a by means of the drive force transmitting mechanism 7, and sector arms 13, 14 are provided on the other surface (back surface) of the base plate 1.

The first actuator 4 is an electromagnetic actuator which, in this embodiment, is one of the known type pulse motors and includes a stator 4a, an energizeable drive coil 4b, and a rotor 4c formed of a permanent magnet. The first actuator 4 employs a system of driving by a constant voltage circuit, and the strength of the magnetic force can be adjusted by adjusting an electric current. The first actuator 4 has a static stable position in which the rotor 4c is retained when no power is supplied and which is defined by the positions of magnetic poles on the rotor 4c and magnetic poles on the stator 4a. When electricity is supplied to energize the drive coil 4b, the magnetic poles of the rotor 4c move between the magnetic poles on the stator, and then stand still at the static stable position, where the rotor 4c is retained. The static stable position is determined by the number of magnetic poles of the rotor 4c and the number of magnetic poles provided on the inner periphery of the recess of the stator 4a, which surrounds the rotor. In this case, two static stable positions are provided by the combination of two magnetic poles on the rotor and four magnetic poles on the stator. The first actuator 4 is secured to the top plate 3a of the unit case 3 by an intermediate member 6 in a state of being pressed against the top plate 3a, and a rotary shaft 4d formed integrally with the rotor 4c is provided so as to penetrate the intermediate member 6 and project from the lower surface thereof.

A drive member 8 which constitutes part of the drive force transmitting mechanism 7 is provided at the extremity (lower end in FIG. 7) of the rotary shaft 4d of the first actuator 4. An operating member 9, being interlockable with the drive member 8, is pivotably supported by a shaft supporting device 6b projecting from the center of the lower surface of the intermediate member 6. A transmission gear mechanism is established by engagement between driven teeth 9a of the operating member 9 and driving teeth 8a of the drive member 8, and the operating member 9 is interlockable with the drive member 8. The drive member 8 is formed of a fan-shaped plate member fanning out to a small extent, and the narrow end portion of the fan is secured to the rotary shaft 4d of the first actuator 4 so as to be capable of integrally rotating therewith. An arcuate portion formed at the extremity of the drive member 8 corresponds to the driving teeth 8a formed by cutting the gear into the teeth-shape.

The operating member 9 has a portion formed into an arcuate shape in a range of a predetermined distance from the rotational center, and this arcuate portion is provided along part of the periphery thereof with the driven teeth 9a, which are engageable with the driving teeth 8a of the drive member. Part of the arcuate portion which is not provided with the driven teeth 9a extends outward and is formed into a lever member 9b. A drive pin 9d for driving the sectors 12 is provided on the lower surface of the extremity of the lever member 9b. The drive pin 9d can drive the sectors 12 via a sector arm 13 provided on the back side of the base plate 1 through an arcuate groove 1c formed on the base plate 1. On the outer periphery of a bearing member of the operating member 9, there is provided an engaging arm 9c, extending in a direction slightly different from that of the lever member 9b and, at the same time, extending to an extent not protruding from the upper surface of the lever member 9b, and formed integrally with the operating member 9. At the extremity of the engaging arm 9c, there is formed a contactable pin 9f, which will be described later, projecting upward. The engaging arm 9c serves to generate a signal indicating the change of the state of the synchronous switch 5 and constitutes a member of the sector retaining unit 19 described later.

In this manner, the drive force transmitting mechanism 7 is configured in such a manner that the drive member 8 pivots in accordance with the rotation of the rotor 4c of the first actuator 4, and the operating member 9 interlocked with the drive member 8 via the transmission gear mechanism can pivot by an angle corresponding to the ratio of the distances from the respective pivots to the pitch circles of the respective teeth. The pivotal angle of the operating member 9 is the same as the pivotal angle of the sector arm 13, and the opening-and-closing amount of the sectors 12 is determined by the pivotal angle of the operating member 9 and the length of the sector arm 13. In the drawing, the distances from the pivots of the respective members 8, 9 to the pitch circles are illustrated to be different from each other, and hence seem to be different in the pivotal angle as well. However, when the torque of the first actuator 4 is considered, it is preferable to set the pivotal angles of the respective members to substantially the same angle.

Subsequently, the synchronous switch 5 described above will be described. The synchronous switch 5 used in the sector drive unit 2 includes a detection spring 17 and a detection pin 18. The synchronous switch 5 is a sector position detection sensor for detecting the state of the sectors 12. The detection spring 17 employed here is a helical torsion coil spring having straight portions extending in opposite directions at the ends. The coil portion of the spring is fitted on a shaft 3d projecting from the unit case 3 so that one of the straight portions extending from the coil portion can abut against the contactable pin 9f provided at the extremity of the engaging arm 9c formed integrally with the operating member 9. The pivotal range of the other straight portion can be restricted by abutting against a projection 6c projecting from the upper surface of the intermediate member 6. The other straight portion is bent upward at a right angle at the extremity thereof, though it is not shown, and the extremity is brought into electrical communication with the printed board P provided on the upper surface of the top plate 3a of the unit case 3 to function to as an information output section, so that the detected data can be supplied to the CPU (not shown) of the camera body. The CPU controls the various operations of the camera in a manner well known in art.

The detection pin 18 is formed of a conductive round rod member, and the detection pin 18 is supported between the printed board P and the intermediate member 6 at both ends, so as to electrically communicate with the printed board P. The detection pin 18 is arranged at the position in which the intermediate position of the straight portion of the detection spring 17 can abut against the detection pin 18 when the sectors 12 leave the aperture 1a in a fully opened state, and the straight portion can stay spaced apart therefrom when the aperture 1a is closed. Detected data indicating whether the detection spring 17 and the detection pin 18 are in contact with each other or out of contact with each other can be supplied from the terminals 17a, 18a provided on the printed board P. Such a contacting action is performed by elastically deforming the detection spring 17 by the pivotal movement of the operating member 9 via the contactable pin 9f.

A light-shielding curtain for opening and closing the aperture 1a is provided on the other surface (back surface) of the base plate 1. The light-shielding curtain includes the plurality of sectors 12, the first sector arm 13 for driving the sectors 12, and the second sector arm 14 provided above the first sector arm 13, constituting a parallel link mechanism. The first sector arm 13, being positioned on the lower side, is pivotably supported by a shaft 1d (See FIG. 7) provided concentrically with the rotational center of the operating member 9 on the lower surface side of the base plate 1. The drive pin 9d of the operating member 9 penetrates the arcuate groove 1c on the base plate 1 and is inserted into a hole formed at the intermediate position of the first sector arm 13, so that the arm can be driven by the operating member. The extremity of the first sector arm 13 is pivotably connected to the sectors 12 via connecting pins 13a. On the other hand, the second sector arm 14 positioned above the first sector arm 13 is pivotably supported on the lower surface of the base plate 1 at a position a little apart from the position where the first sector arm is 13 supported. The extremity of the second sector arm 14 is pivotably connected to the sectors 12, so that the sectors 12 constitute a parallel link mechanism.

The sector retaining unit 19 for retaining the sectors 12 in the opened state or in the closed state is provided below the drive force transmitting mechanism 7 in proximity thereto. The sector retaining unit 19 includes the engaging arm 9c formed integrally with the operating member 9, the second actuator 21, and a locking member 23. The second actuator 21 is an electromagnetic actuator which, in this embodiment, employs a known type of pulse motor having a stator 21a, an energizeable drive coil 21b, and a rotor 21c, and the second actuator 21 functions like a solenoid in that the rotor 21c rotates by a predetermined rotational angle when supplied with one pulse of electricity, and returns to the original position when the supply of power is turned OFF. The rotational angle of the rotor 21c is determined by the number of poles of the stator 21a, and is set to about 30° in this embodiment.

Figure 3:
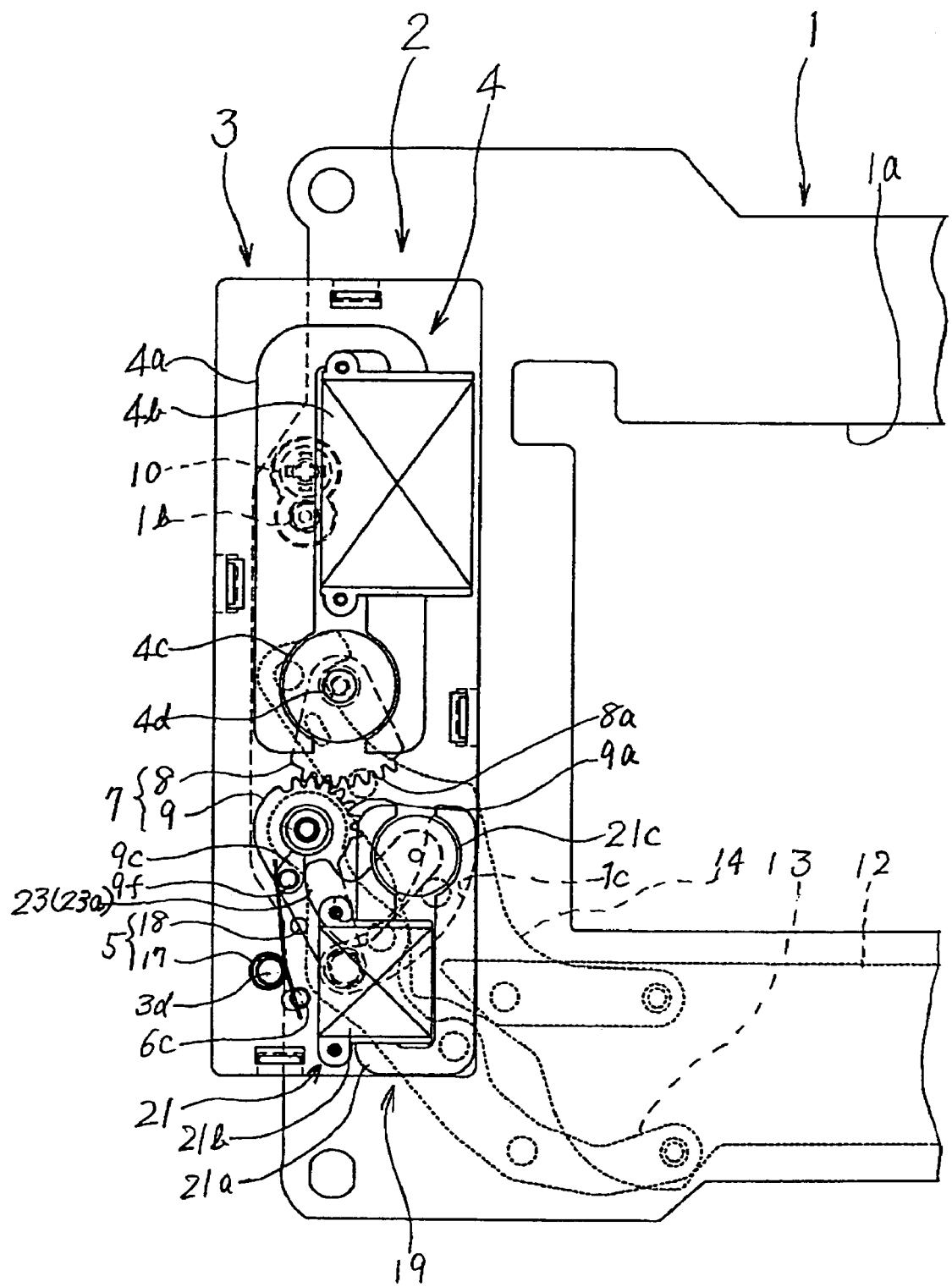
FIG. 3 is a plan view showing a state in which the aperture is fully opened and the sector retaining unit retains the sectors in an opened state.
Figure 4:
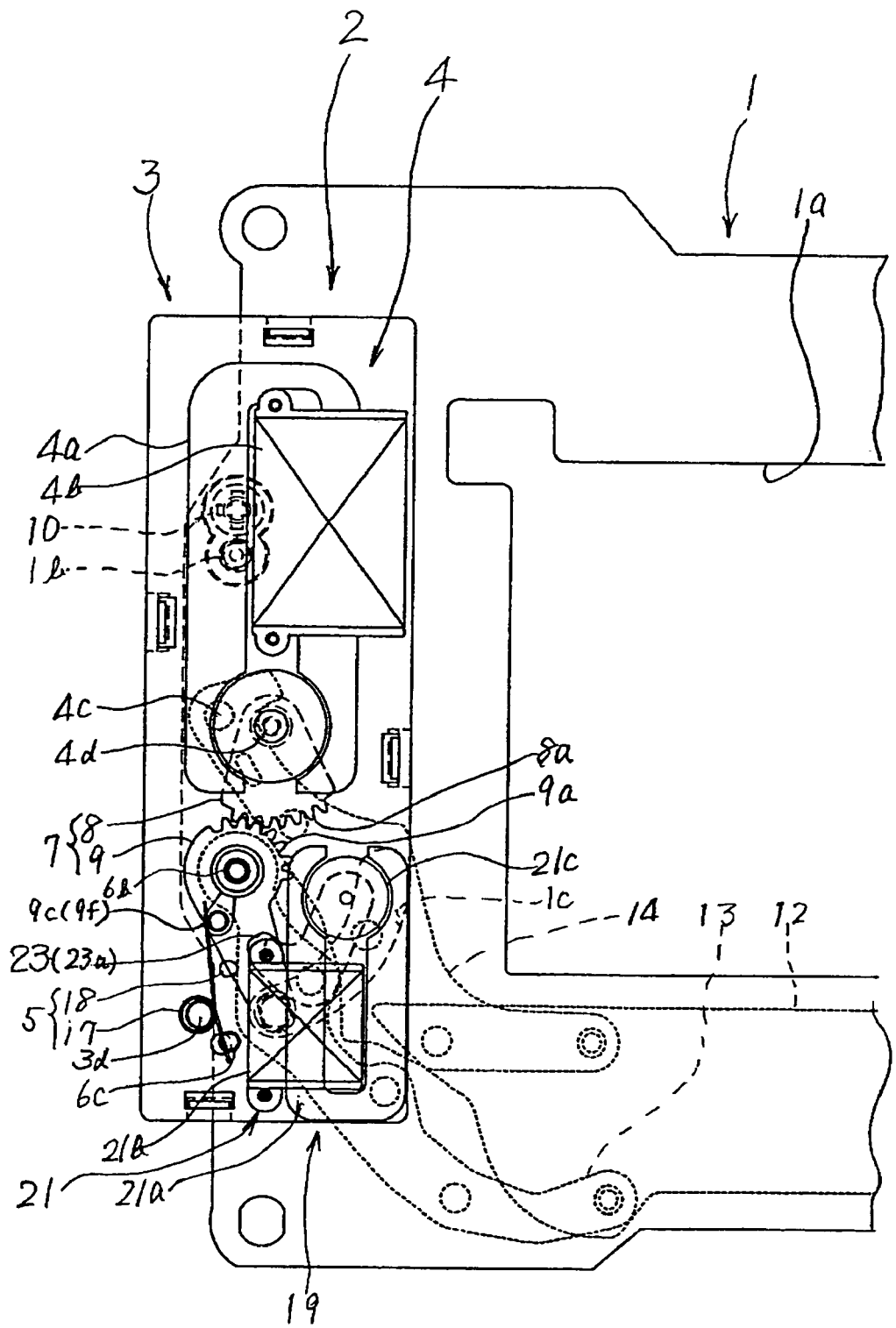
FIG. 4 is a plan view showing a state in which the aperture is fully opened and the sector retaining unit does not retain the sectors.
Figure 5:
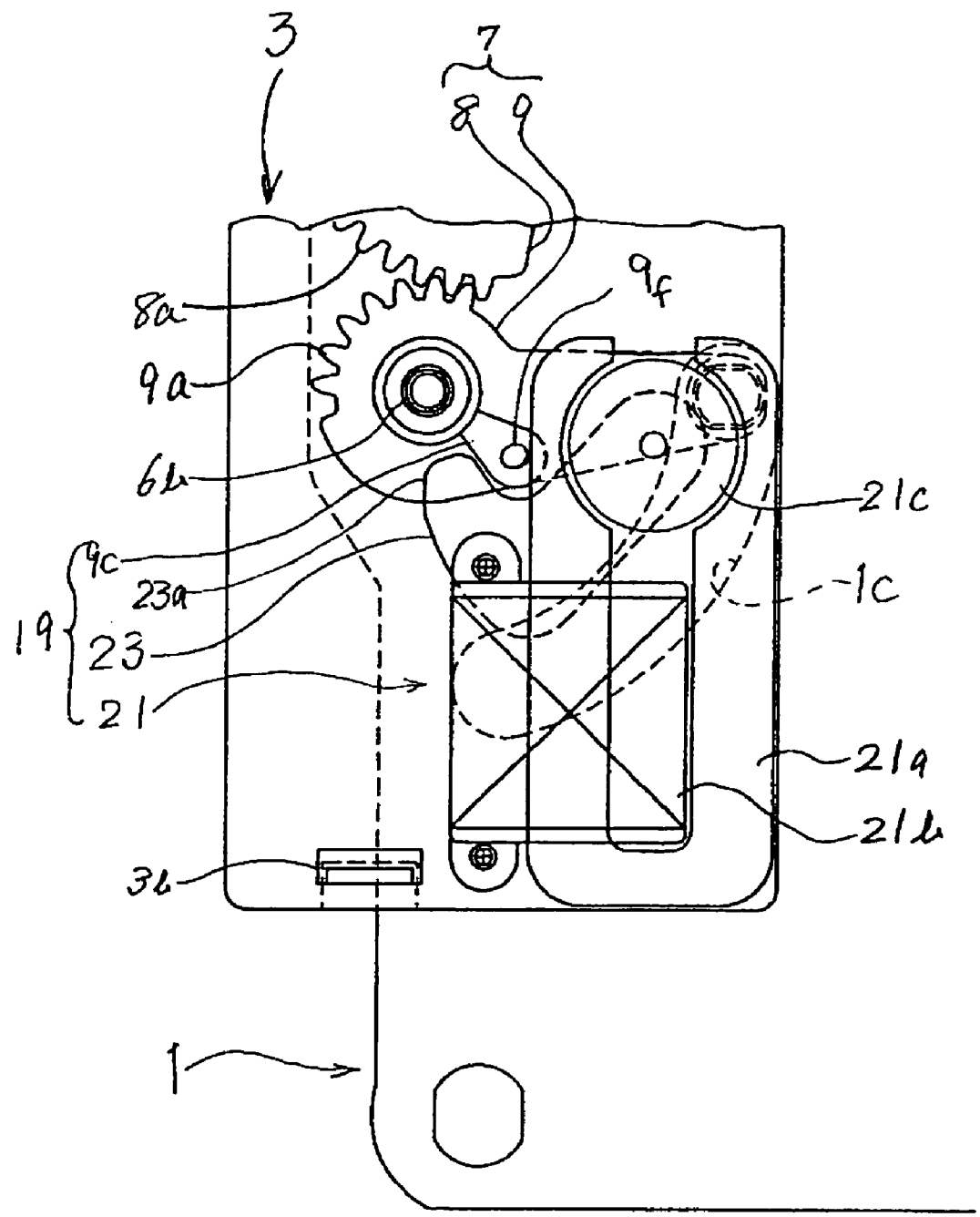
FIG. 5 is an enlarged view showing a state in which a locking member of a sector retaining unit is retracted.
Figure 6:
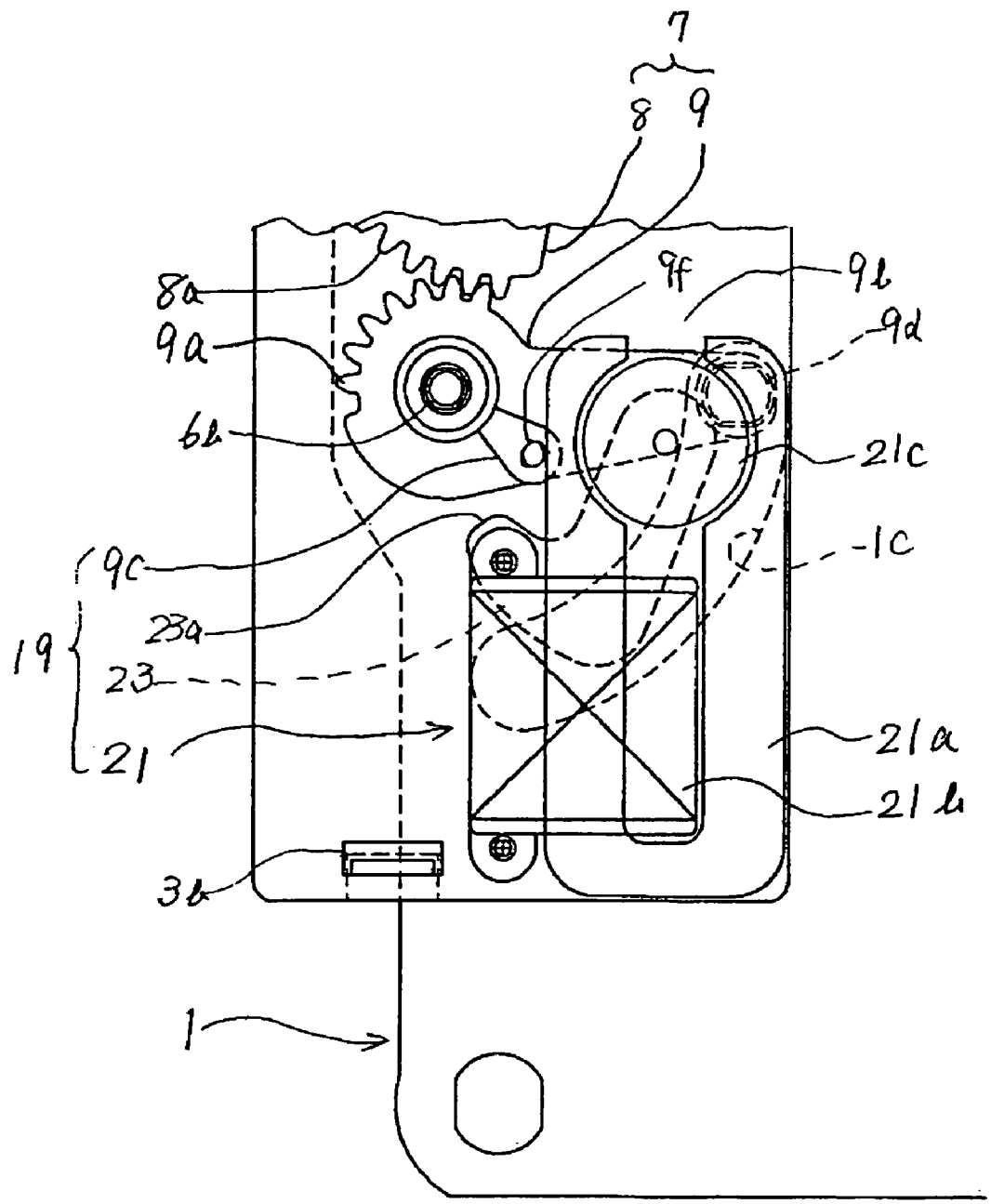

The locking member 23 is formed of an inverted L-shaped plate member and is secured to the rotary shaft of the second actuator 21 which projects downward from the intermediate member 6. The locking member 23 is configured so that a hook portion 23a can be moved into and retracted from the operating area of the operating member 9 (engaging arm 9c) by being pivoted in the range of the above-described rotational angle. In the state of FIG. 2 and FIG. 4, since the hook portion 23a of the locking member 23 is retracted from the operating area, the sectors 12 are kept free (See FIG. 6). On the other hand, in the state shown in FIG. 1 and FIG. 3, since the locking member 23 is moved into the operating area, the sectors 12 are restricted in the state of being closed (FIG. 1) or being opened (FIG. 3) (See FIG. 5).

FIG. 7 is an enlarged cross section of the respective mechanisms of the sector drive unit 2. As shown in the drawing, the first actuator 4, the synchronous switch 5, and the second actuator 21 of the drive mechanism of the sector drive unit 2 are fixed by the intermediate member 6 mounted to one of the surfaces (lower surface in FIG. 3) of the unit case 3. The top plate or cover 3a of the unit case 3 is formed of a rectangular plate member and is provided with locking portions 3b, . . . for detachably connecting the top plate 3a to the intermediate member 6 around the periphery thereof. The intermediate member 6 retains the first actuator 4, the synchronous switch 5, and the second actuator 21 between the top plate 3a of the unit case 3 and the upper surface of the intermediate member 6, and the intermediate member 6 is provided with mounting portions 6f, 6g for mounting the intermediate member 6 to the base plate 1. The intermediate member 6 supports the drive force transmitting mechanism 7 and the sector retaining unit 23 on the lower surface, in addition to the parts described above. Since the sector drive unit 2 unitized in the manner described above can easily be attached to and detached from the base plate 1, it can be interchangeably mounted to various base plates and sectors.

An urging spring 16 for urging the first sector arm 13 in the direction to open the sectors 12 is provided on the back surface of the base plate 1. The urging spring 16 comprises a helical torsion coil spring having a coil portion inserted onto the shaft 1d, which supports the first sector arm 13, so that one of the straight portions extending from the coil portion can abut against a locking projection 1e projecting on the back surface of the base plate 1. The other straight portion of the urging spring 16 abuts against the side portion of the first sector arm 13 to urge the arm in the direction to open the sectors 12. One of the functions of the urging spring 16 is to facilitate the opening operation of the sectors 12 by urging the sector arm 13 in the opening direction at the time of a shutter release operation when the sectors 12 are at the initial position. Another function of the urging spring 16 is to reduce the play or gap and thus the rattling generated between the drive force transmitting mechanism 7 and the sectors 12 by urging them in one direction, which is known as "positional adjustment," when the aperture 1a is brought into an opened state. The urging spring 16 and the sectors 12 are protected by a sector retaining plate 15.

Connection between the base plate 1 and the sector drive unit 2 is achieved by aligning positioning pins 1b, provided at a plurality of locations on the upper surface of the base plate 1 and positioning holes 6a formed on the mounting portions 6f, 6g of the intermediate member 6, pressing both of them toward each other, and securing them with the screws 10 as fixing members. When the sector drive unit 2 is mounted to the base plate 1, the operating member 9 pivotably supported by the shaft 6b projected from the intermediate member 6 is stably supported by a projection 1g projected from the base plate 1, and the drive pin 9b penetrates the arcuate groove 1c of the base plate and projects toward the back side thereof.

Figure 8:
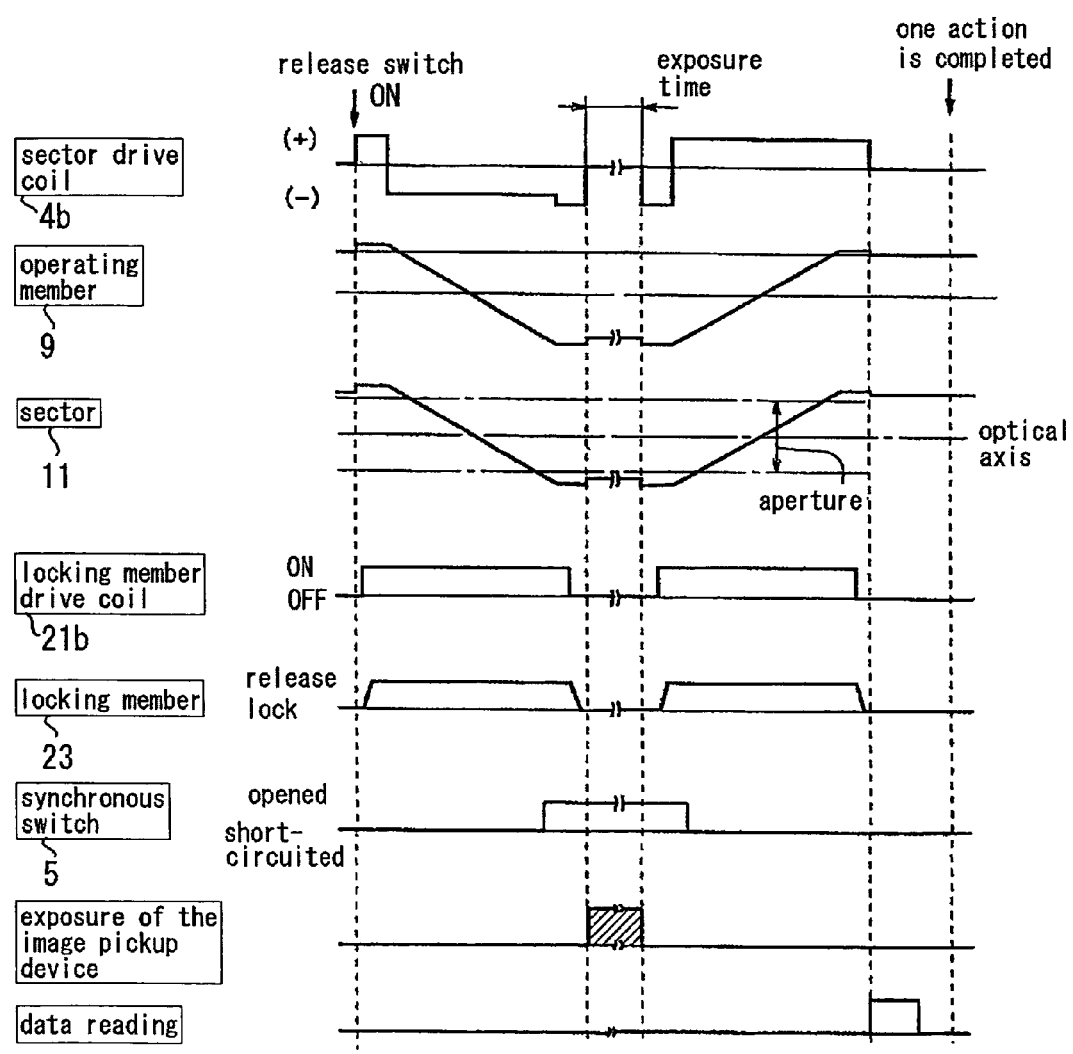
FIG. 8 is a timing chart showing the operation of the embodiment shown in FIGS. 1–7.

Referring now to the timing chart shown in FIG. 8, the operation of the present embodiment will be described. Along the ordinate shown in FIG. 8, a sector drive coil designates the drive coil 4b of the first actuator 4 in the above-described configuration, and in this case, the direction of the electric current that causes the rotor 4c to open the aperture 1a is designated as minus (−), and an electric current in the opposite direction is designated as plus (+). A locking member drive coil designates the drive coil 21b of the second actuator 21. Exposure of the image pickup device designates the operation of converting an image of the imaged object into a digital signal. The abscissa in FIG. 8 designates time, and the ratios of the lengths of the time periods are not shown as the actual ratios and have been exaggerated for the sake of convenience of description. The CPU controls the supply of power to the components in accordance with the selected mode of operation of the camera.

Figure 2:
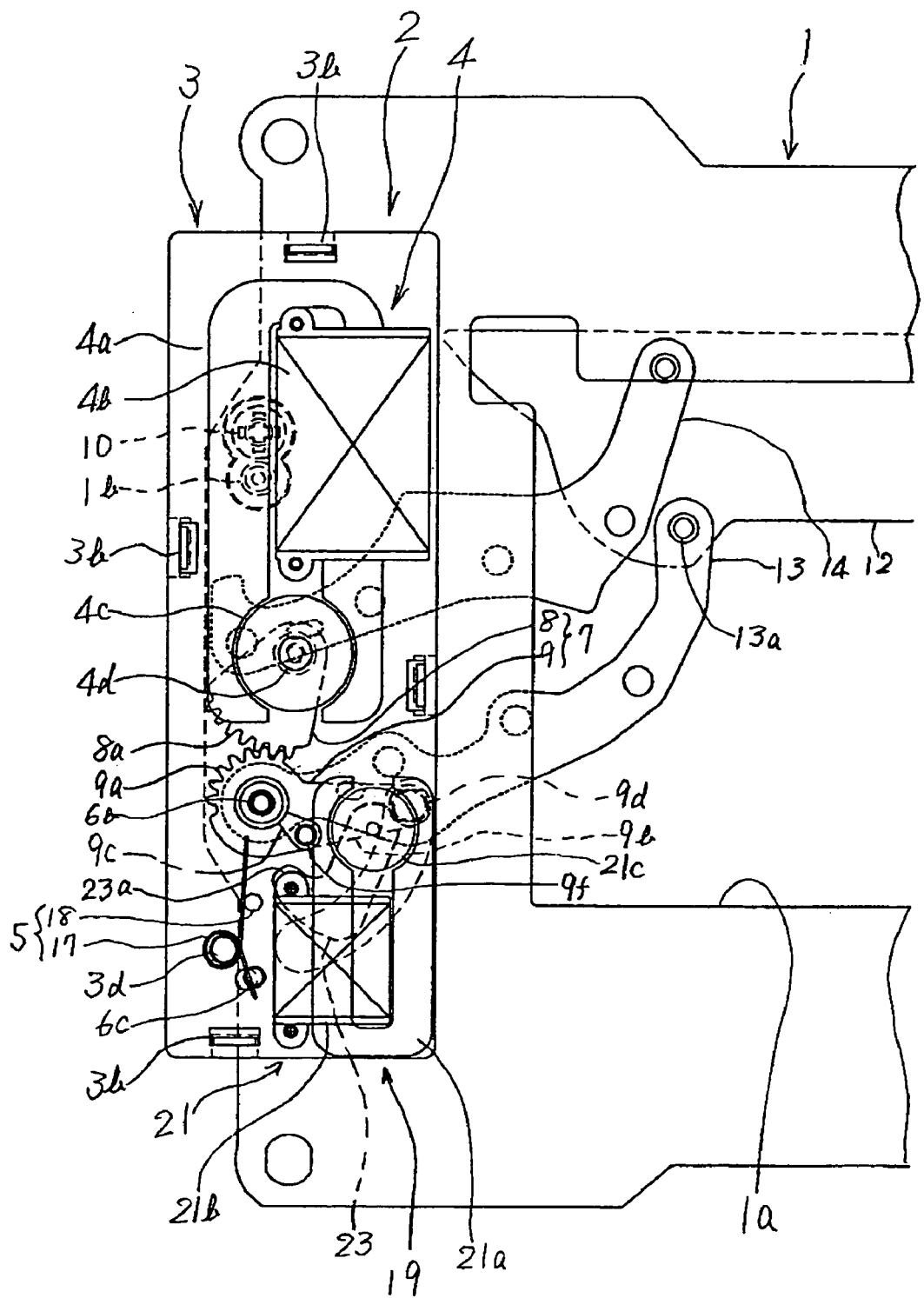
FIG. 2 is a plan view showing a state in which the aperture is fully closed and the sector retaining unit does not retain the sectors.

In the initial state, as shown in FIG. 1, the sectors 12 close the aperture 1a. In this state, since the power supply to the drive coil 4b of the first actuator 4 is OFF, the operating member 9 and the sectors 12 stand still at the initial position (static stable position). At this time, the detection spring 17 and the detection pin 18 of the synchronous switch 5 abut against each other (short-circuited). The locking member 23 is in the operation area of the operating member 9 (engaging arm 9c) and retains the sectors 12 in the closed state (See FIG. 5) by locking the operating member 9. When a release switch (not shown) is turned ON, a positive electric current (+) for closing the sectors 12 is supplied from the CPU. Accordingly, positional adjustment of the sectors 12 is performed for eliminating free play and rattling among the components generated by the previous picture-taking operation, so that picture-to-picture errors are reduced. Immediately after the release switch is turned ON, power to the locking member drive coil 21b of the second actuator 21 is turned ON. Therefore, as shown in FIG. 2, the locking member 23 is retracted from the operating area of the operating member 9 and accordingly, the engagement with the engaging arm 9c is also released, whereby the operating member 9 is released from the locked state (See FIG. 6).

Subsequently, a negative electric current (−) is flown in the direction opposite from the case of positional adjustment performed previously by the CPU with respect to the sector drive coil 4b of the first actuator 4. Accordingly, the rotor 4c rotates counterclockwise, and the operation to open the sectors 12 is initiated via the drive force transmitting mechanism 7. Though the aperture 1a is completely opened as shown in FIG. 3 upon completion of the opening operation of the sectors 12, a slightly higher negative electric current is flown to the drive coil 4b for a short interval to prevent bounding or rebounding of the sectors and to perform positional adjustment of the components. When the opening operation of the sectors 12 is completed, the power supply to the second actuator 21 is turned OFF, and the rotor 21c is automatically returned to its original position. Therefore, the locking member 23 is moved again into the operating area of the operating member 9, and in turn restricts the movement of the operating member 9 by locking the engaging arm 9c on the outside of the hook portion 23a. Consequently, the sectors 12 are retained in an opened state in which the aperture 1a is open. When the sectors 12 are retained in the opened state, the power supply to the sector drive coil 4b is turned OFF.

When the sectors 12 are completely opened, the contactable pin 9f provided upright on the engaging arm 9c abuts against one of the straight portions of the detection spring 17 and presses the spring counterclockwise. Therefore, the detection spring 17 moves away from the detection pin 18 thereby opening the synchronous switch 5 (See FIG. 3), and signal data generated by the change of the state is supplied to the CPU. The CPU receives the signal data indicating the change of state of the synchronous switch 5 and verifies that the aperture 1a is in the opened state, and then the CPU supplies an exposure-start signal to the image pickup device to initiate an exposure. Since the exposure operation, which in this embodiment is image reading by the image pickup device, is performed with no power being applied to the drive coils of the actuators, generation of noise is prevented and power consumption is reduced.

After having performed positional adjustment by flowing a negative electric current (−) in the direction to open the sectors 12 to the sector drive coil 4b simultaneously with completion of the exposure operation, a positive electric current (+) in the opposite direction is flown to move the operating member 9 in the closing direction. At this time, by turning ON the power supply to energize the drive coil 21b, the locking member 23 is retracted from the operating area of the operating member 9 to release the restricted or locked state of the operating member 9 and the sectors 12 (See FIG. 4). When the sectors 12 are in motion, the locking member 23 continues to be retracted from the operating area of the operating member 9, and when the sectors 12 are completely closed, the power supply to the locking member drive coil 21b is turned OFF, and the locking member 23 moves again into the operating area of the operating member 9 to restrict the operating member 9. Since the operating member 9 is rotated counterclockwise at this time, the contactable pin 9f which has been pressing the detection spring 17 of the synchronous switch 5 moves away from the detection spring 17, and hence the detection spring 17 automatically returns to its original position. Accordingly, the straight portion of the detection spring 17 moves away form the detection pin 18 thereby opening the synchronous switch 5 and changes the direction of the output signal. The CPU receives this output and verifies initiation of the closing operation of the aperture 1a.

In this manner, the sectors 12 are returned to their original position shown in FIG. 1. However, the power supplied to the drive coil 4b of the first actuator 4 is continued in the same direction to the drive coil 4b for a predetermined time period for positional adjustment even after the returning motion of the drive force transmitting mechanism 7 and the sectors 12 is completed, and then the power is turned OFF to return them to their initial position. Upon stopping the supply of power to the drive coil 4b, image data accumulated in the image pickup device by exposure is supplied to the CPU, whereby one operation to take a picture is completed. Data read by the image pickup device is supplied to the storage device in the camera body and is stored there. Upon completion of data storage, one picture-taking action is completed.

In the description described above, the first actuator is configured to be driven by a constant voltage circuit. However, it can be driven by a constant current circuit, as a matter of course. Since the strength of the magnetic flux of the drive coil is proportional to the electric current, this relationship can be stabilized more advantageously with the constant current circuit. In contrast, the constant voltage circuit is convenient for controlling the sectors because the speed of movement of the sectors can be adjusted by changing the driving current during normal or reverse rotation of the actuator, and hence the constant voltage circuit is employed in this embodiment.

Figure 9:
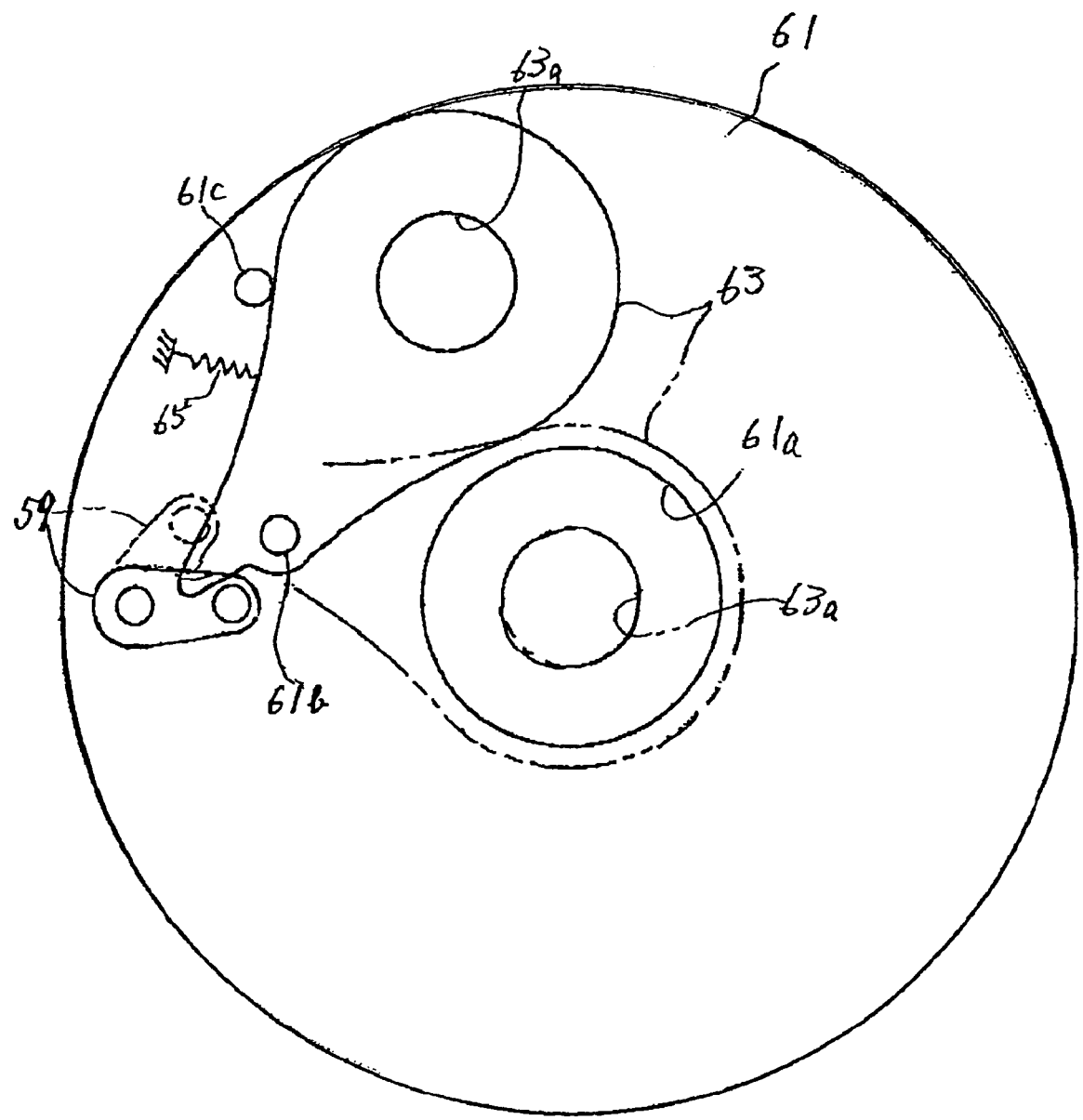
FIG. 9 is a front view showing an example in which the present invention is applied to a diaphragm device as another embodiment.

Subsequently, an example in which the sector drive unit 2 according to the present invention described above is applied to a diaphragm device of a camera will be described. The diaphragm device may be, for example, like that described in a related application filed by the present applicant (See JP-A-2001-281722, FIG. 1 to FIG. 5), and as shown in FIG. 9 comprises an operating member 59 (which corresponds to the operating member 9 in FIG. 1) of the sector drive unit 2 according to the present invention is provided on the left side of a circular aperture 61a formed on a base plate 61. The operating member 59 pivots within an angular range of about 45° by being interlocked with the drive member 8 (See FIG. 1), so that one or more sectors 63 can be pivoted. The sector drive unit 2 is provided on the base plate 61 to drive the sectors 63.

The one or more sectors 63 each include a diaphragm opening 63a which is smaller than the aperture 61a, and the sectors 63 are pivotably supported on the base plate 61 via a shaft portion 61b projecting from the base plate 61. In a state in which the sectors 63 rotate clockwise and are stopped by a stopper (not shown), the diaphragm opening 63a is positioned at the central position of the aperture 61a. The drive source of the sectors 63 corresponds to the first actuator 4 (See FIG. 1) of the sector drive unit 2 of the present invention. However, the operating member 9 of the drive force transmitting mechanism 7 is modified to a drive lever (operating member) 59 shown in FIG. 6. When the drive lever 59 is rotated counterclockwise from the state shown in the drawing, the sectors 63 rotate clockwise against the urging force of an urging unit 65, and the diaphragm opening 63a is positioned at the center of the aperture 61a. Therefore, a desired aperture value can be selected. When the power to the actuator is turned OFF, the one or more sectors 63 are retained at the selected aperture position by virtue of the locking member 23. When releasing the sectors 63 at the aperture position, the locking member 23 is retracted, then electricity in the reverse direction is supplied to the actuator 4 to rotate the operating member 59 in the direction to make the sectors 63 retract from the aperture 1a. Since the sectors 63 are urged counterclockwise by the urging unit 65, they return to their original position and are stopped by a stopper pin 61c.

Figure 10:
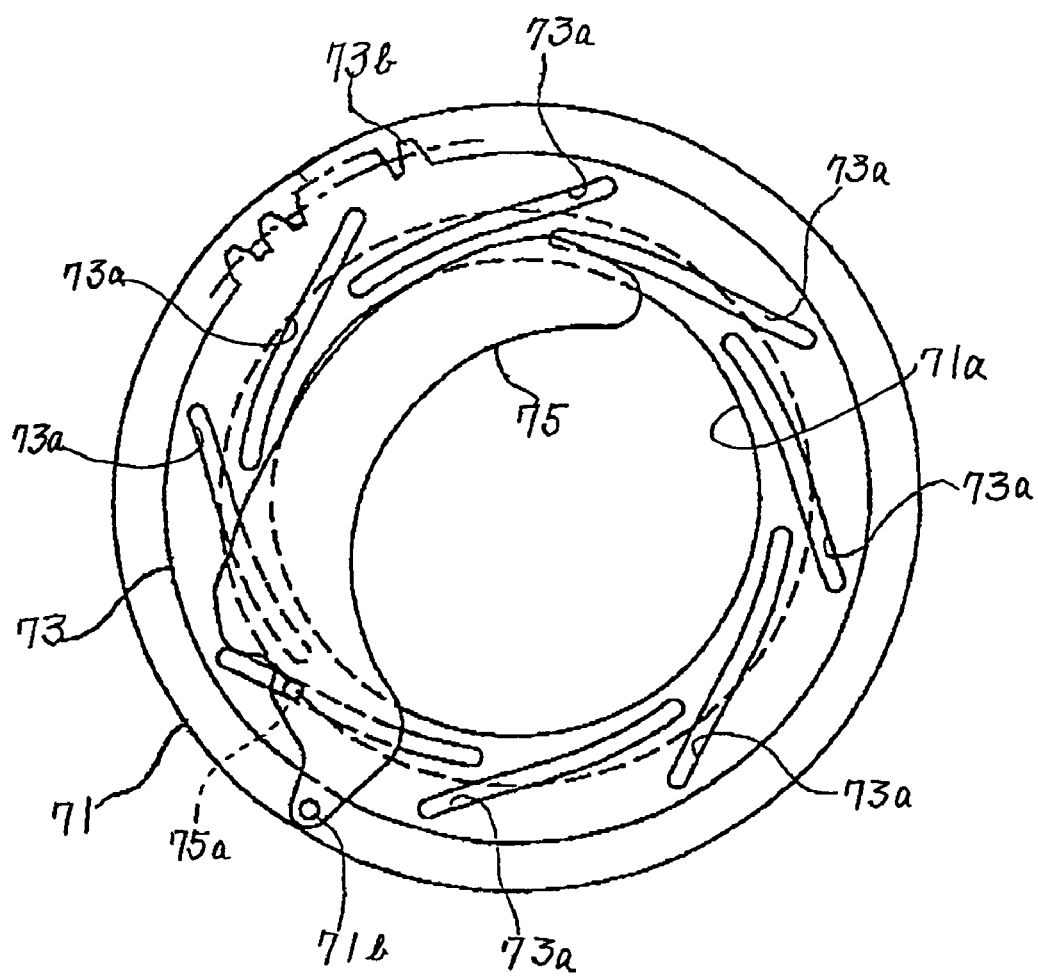
FIG. 10 is a front view showing an example in which the present invention is applied to the diaphragm device as another embodiment.

Alternatively, the sector drive unit 2 according to the present invention can be applied as a sector drive unit for a diaphragm device of a silver-film-type camera. FIG. 10 shows a structure of a diaphragm unit including a base plate 71, a drive ring 73, and sectors 75 according to an application filed by the present applicant (See JP-A-2000-89294, FIG. 1). The sector drive unit 2 is provided in this diaphragm unit to drive the sectors 75. In FIG. 10, the base plate 71 having an aperture 71a is provided with the drive ring 73. The drive ring 73 is provided with eight obliquely extending elongated grooves 73a, . . . , and driven pins 75a of the sectors 75 provided pivotably along the periphery of the base plate 71 at regular intervals slidably engage respective ones of the elongated grooves 73a. The aperture 71a can be adjusted as desired between the maximum diaphragm opening and the minimum diaphragm opening by the pivotal movement of the respective sectors 75 caused by the rotation of the drive ring 73. The drive ring 73 may be connected to a modified operating member 9 of the drive force transmitting mechanism 7 (See FIG. 1) provided on the sector drive unit 2 to teeth 73b formed along the outer periphery thereof. That is, the operating member 9 may be provided with teeth (not shown) at the extremity thereof instead of the lever portion 9b, so that the teeth engage with the teeth 73b of the drive ring. However, since the first actuator in this case is not suitable for a meter-type which rotates the drive ring 73 by a required amount only by one drive pulse, it is necessary to provide a step-system for stepwise driving the drive ring 73 by a plurality of drive pulses.

While the sector drive unit for a camera according to the present invention is configured to be applied to a digital camera provided with an electronic shutter, the present invention is not limited thereto and may be applied generally to cameras such as a diaphragm device of a camera having a diaphragm-type shutter, or a digital camera having a focal plane shutter. Although the gear mechanism is used as the drive force transmitting mechanism in the description, the present invention is not limited thereto, and a link mechanism or a slider crank mechanism may also be employed. While the synchronous switch 5 is configured to detect the fully opened state of the sectors according to the present invention, it is not limited thereto, and the position of the synchronous switch may be changed so as to detect the fully closed state of the sectors.

Since the sector drive unit for a camera according to the present invention is configured in such a manner that the sectors can be retained at the aperture-open or close positions by the sector retaining unit, even when the camera is subjected to an impact, the state of the sectors can be retained to a preset state without change. In addition, since the sector retaining unit is configured to be driven by the second actuator, which is different from the actuator for driving the sectors, the load of the actuator for the sector retaining unit may be reduced, and hence simplification and noise reduction of the drive circuit of the first actuator are achieved. In addition, by setting the second actuator in such a manner that the power is turned OFF when the sector retaining unit is at the sector retaining position, and the power is turned ON when the sectors are not at the retained position, electric power is consumed only for driving the sectors, and not during other periods of time, thereby achieving a reduction of power consumption. In the same manner, in the light-shielding device of a digital camera, data is read by the image pickup device while the sectors are maintained at the fully opened position. At this time, since the sectors can be maintained with no power applied, generation of noise can be prevented.

What is claimed is:

1. A sector drive unit for a camera for driving sectors to open and close an aperture formed on a base plate, the sector drive unit comprising:
    a first actuator for driving the sectors to open and close the aperture;
    a drive force transmitting mechanism for transmitting the driving force of the first actuator to the sectors;
    a sector retaining unit for retaining the sectors at a position opening the aperture and at a position closing the aperture; and
    a second actuator for driving the sector retaining unit to a position to retain the sectors and to a position not to retain the sectors.

2. A sector drive unit for a camera according to claim 1; wherein the drive force transmitting mechanism comprises a drive member connected to a rotary shaft of the first actuator, and an operating member for operating the sectors in response to a driving force exerted, by the drive member; and the sector retaining unit has a locking member mounted so as to be moved in or retracted from an operating area of the operating member, the locking member being configured to restrict the operation of the operating member when the locking member is moved in the operating area and to release the restricted state of the operating member when the locking member is retracted from the operating area.

3. A sector drive unit for a camera according to claim 2; wherein the second actuator comprises an electrically energizeable actuator which is turned OFF when the sector retaining unit is at the position for retaining the sectors and turned ON when the sector retaining unit is at the position where the sectors are not retained.

4. A sector drive unit for a camera according to claim 3; wherein the second actuator includes a rotor formed of a permanent magnet and having a plurality of static stable positions within the range of one rotation of the rotor, one static stable position corresponding to the position where the sectors are retained by the sector retaining unit, and another static stable position which differs from the one static stable position corresponding to the position where the sectors are not retained by the sector retaining unit.

5. A sector drive unit for a camera according to claim 2; wherein the second actuator includes a rotor formed of a permanent magnet and having a plurality of static stable positions within the range of one rotation of the rotor, one static stable position corresponding to the position where the sectors are retained by the sector retaining unit, and another static stable position which differs from the one static stable position corresponding to the position where the sectors are not retained by the sector retaining unit.

6. A sector drive unit for a camera according to claim 1; wherein the second actuator includes a rotor formed of a permanent magnet and having a plurality of static stable positions within the range of one rotation of the rotor, one static stable position corresponding to the position where the sectors are retained by the sector retaining unit, and another static stable position which differs from the one static stable position corresponding to the position where the sectors are not retained by the sector retaining unit.

7. A sector drive unit for a camera according to claim 1; wherein the second actuator comprises an electrically energizeable actuator which is turned OFF when the sector retaining unit is at the position for retaining the sectors and turned ON when the sector retaining unit is at the position where the sectors are not retained.

8. A sector drive unit for a camera for driving one or more sectors to open and close an aperture formed in a base plate, the sector drive unit comprising: a first actuator for producing a driving force; a drive force transmitting mechanism for transmitting the driving force to the one or more sectors to thereby drive same to an aperture-opening position and an aperture-closing position; a sector retaining unit driveable to a retaining position wherein the sector retaining unit releasably retains the one or more sectors in the aperture-opening position and the aperture-closing position and a non-retaining position wherein the sector retaining unit does not retain the one or more sectors; and a second actuator for driving the sector retaining unit to the retaining and non-retaining positions.

9. A sector drive unit according to claim 8; wherein the first actuator has a rotary shaft for producing a rotational driving force; the drive force transmitting mechanism has a pivotably mounted operating member responsive to the rotational driving force for driving the one or more sectors; and the sector retaining unit has a movable locking member engageable with the operating member when the sector retaining unit is in the retaining position to prevent driving movement of the operating member and disengageable from the operating member when the sector retaining unit is in the non-retaining position to allow driving movement of the operating member.

10. A sector drive unit according to claim 9; wherein the second actuator comprises an electromagnetic actuator energizeable to drive the sector retaining unit to the non-retaining position and deenergizeable to permit the sector retaining unit to be driven to the retaining position.

11. A sector drive unit according to claim 9; wherein the second actuator includes a rotor comprised of a permanent magnet having a plurality of static stable positions within the range of one rotation of the rotor, a first one of the static stable positions corresponding to the retaining position of the sector retaining unit and a second one of the static stable positions, which is different from the first static stable position, corresponding to the non-retaining position of the sector retaining unit.

12. A sector drive unit according to claim 8; wherein the first and second actuators each comprises a pulse motor.

13. A sector drive unit according to claim 8; wherein the second actuator includes a rotor comprised of a permanent magnet having a plurality of static stable positions within the range of one rotation of the rotor, a first one of the static stable positions corresponding to the retaining position of the sector retaining unit and a second one of the static stable positions, which is different from the first static stable position, corresponding to the non-retaining position of the sector retaining unit.

* * * * *